United States Patent
Suzuki (10) Patent No.: US 11,894,561 B2
(45) Date of Patent: Feb. 6, 2024

(54) SECONDARY BATTERY

(71) Applicant: Panasonic Intellectual Property Management Co., Ltd., Osaka (JP)

(72) Inventor: Hirotetsu Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 15 days.

(21) Appl. No.: 16/862,528

(22) Filed: Apr. 29, 2020

(65) Prior Publication Data

US 2020/0381737 A1 Dec. 3, 2020

(30) Foreign Application Priority Data

May 30, 2019 (JP) .................... 2019-101774

(51) Int. Cl.
*H01M 4/485* (2010.01)
*H01M 4/66* (2006.01)
*H01M 10/0569* (2010.01)

(52) U.S. Cl.
CPC .......... *H01M 4/666* (2013.01); *H01M 4/485* (2013.01); *H01M 4/661* (2013.01); *H01M 4/667* (2013.01); *H01M 10/0569* (2013.01); *H01M 2300/0034* (2013.01)

(58) Field of Classification Search
CPC ......... H01M 10/0568; H01M 10/0569; H01M 2300/0034; H01M 4/485; H01M 4/66; H01M 4/661; H01M 4/666; H01M 4/667
See application file for complete search history.

(56) References Cited

U.S. PATENT DOCUMENTS

| | | | |
|---|---|---|---|
| 9,806,371 B2 | 10/2017 | Hirose et al. | |
| 2002/0086213 A1* | 7/2002 | Utsugi | H01M 4/13 429/231.95 |
| 2010/0203386 A1* | 8/2010 | Chang | H01M 4/131 429/220 |
| 2011/0014518 A1* | 1/2011 | Nakai | C04B 35/01 429/207 |
| 2011/0291043 A1* | 12/2011 | Wilcox | H01M 4/485 252/182.1 |
| 2016/0218358 A1* | 7/2016 | Sakai | H01M 4/505 |
| 2017/0194626 A1* | 7/2017 | Yamamura | H01M 4/523 |
| 2017/0294682 A1* | 10/2017 | Ahn | H01M 10/0525 |
| 2018/0083283 A1* | 3/2018 | Yamashita | H01M 50/20 |

(Continued)

FOREIGN PATENT DOCUMENTS

| | | |
|---|---|---|
| JP | 2001-243957 | 9/2001 |
| JP | 2002-141058 A | 5/2002 |

(Continued)

*Primary Examiner* — Jane J Rhee
(74) *Attorney, Agent, or Firm* — Rimon P.C.

(57) ABSTRACT

Provided is a secondary battery comprising a cathode comprising a cathode current collector and a cathode mixture layer containing and a cathode active material, an anode comprising an anode current collector and coating layer, and a non-aqueous electrolyte containing a non-aqueous solvent and a lithium salt which has been dissolved in the non-aqueous solvent. A surface of the anode current collector is coated with the coating layer. The coating layer contains an alkaline earth metal fluoride. During charge, a lithium metal is deposited on the anode. During discharge, the lithium metal is dissolved in the non-aqueous electrolyte.

12 Claims, 2 Drawing Sheets

(56) References Cited

U.S. PATENT DOCUMENTS

| | | | |
|---|---|---|---|
| 2018/0083284 A1* | 3/2018 | Yamashita | H01M 4/628 |
| 2018/0226624 A1* | 8/2018 | Zhao | H01M 50/434 |
| 2021/0159536 A1 | 5/2021 | Harada et al. | |

FOREIGN PATENT DOCUMENTS

| | | | |
|---|---|---|---|
| JP | 2007-257867 | 10/2007 | |
| JP | 2014-211948 A | 11/2014 | |
| WO | WO-2013066582 A1 * | 5/2013 | H01M 10/052 |
| WO | 2019/087709 A1 | 5/2019 | |

* cited by examiner

SECONDARY BATTERY

BACKGROUND

1. Technical Field

The present disclosure relates to a secondary battery.

2. Description of the Related Art

A higher capacity of a non-aqueous electrolyte secondary battery is required in an information and communication technology field such as a personal computer and a smart phone, in an in-vehicle field, and in a power storage field. As a non-aqueous electrolyte secondary battery having a high capacity, for example, a lithium ion battery is widely used. For example, high capacity of lithium ion batteries has been achieved by using graphite and an alloy active material such as a silicon compound in combination as an anode active material. However, an increase in the capacity of lithium ion batteries is reaching its limit.

Lithium secondary batteries are promising as high capacity non-aqueous electrolyte secondary batteries exceeding lithium ion batteries. In a lithium secondary battery, a lithium metal is deposited on the anode during charge, and the lithium metal is dissolved in a non-aqueous electrolyte during discharge. For example, Patent Literature 1 discloses a lithium secondary battery in which a ten-point average roughness (Rz) defined by JIS B 0601 of a surface of a deposited lithium metal of the anode current collector is not more than 10 μm.

CITATION LIST

Patent Literature

Patent Literature 1: Japanese Patent Application Publication No. 2001-243957

SUMMARY

The present disclosure realizes a more excellent cycle characteristic in a secondary battery in which a lithium metal is deposited on the anode during charge.

The secondary battery according to one aspect of the present disclosure comprises:
- a cathode comprising a cathode current collector and a cathode mixture layer containing a cathode active material;
- an anode comprising an anode current collector and coating layer; and
- a non-aqueous electrolyte containing a non-aqueous solvent and a lithium salt which has been dissolved in the non-aqueous solvent, wherein
a surface of the anode current collector is coated with the coating layer;
the coating layer contains an alkaline earth metal fluoride;
during charge, a lithium metal is deposited on the anode; and
during discharge, the lithium metal is dissolved in the non-aqueous electrolyte.

The present disclosure realizes an excellent cycle characteristic in a secondary battery in which a lithium metal is deposited on the anode during charge.

DETAILED DESCRIPTION OF THE EMBODIMENT

The secondary battery according to a first aspect of the present disclosure comprises:
- a cathode comprising a cathode current collector and a cathode mixture layer containing a cathode active material;
- an anode comprising an anode current collector and coating layer; and
- a non-aqueous electrolyte containing a non-aqueous solvent and a lithium salt which has been dissolved in the non-aqueous solvent, wherein
a surface of the anode current collector is coated with the coating layer;
the coating layer contains an alkaline earth metal fluoride;
during charge, a lithium metal is deposited on the anode; and
during discharge, the lithium metal is dissolved in the non-aqueous electrolyte.

In the secondary battery according to the first aspect, since the coating layer containing an alkaline earth metal fluoride is present on the surface of the anode current collector, overvoltage when the lithium metal is deposited on the anode is decreased. As a result, it is conceivable that reductive decomposition of the non-aqueous solvent is suppressed. Therefore, a cycle characteristic of the secondary battery according to the first aspect is improved.

In a second aspect, for example, in the secondary battery according to the first aspect, a mass of the coating layer per unit area of the anode current collector may be not less than 0.94 μg/cm² and not more than 48.9 μg/cm².

In the secondary battery according to the second aspect, the cycle characteristic is further improved.

In a third aspect, for example, in the secondary battery according to the first or second aspect, the alkaline earth metal fluoride may include at least one kind selected from the group consisting of magnesium fluoride and barium fluoride.

In the secondary battery according to the third aspect, the cycle characteristic is further improved.

In a fourth aspect, for example, the lithium salt of the secondary battery according to any one of the first to third aspects may include at least one kind selected from the group consisting of $LiBF_4$, $LiPF_6$, $LiN(SO_2CF_3)_2$, $LiN(SO_2F)_2$, and lithium difluoro(oxalate) borate.

In the secondary battery according to the fourth aspect, ionic conductivity of the non-aqueous electrolyte can be improved.

In a fifth aspect, for example, the cathode active material of the secondary battery according to any one of the first to fourth aspects may include a lithium composite oxide having a crystal structure which belongs to a space group R-3m or C2/m.

In the lithium composite oxide having a crystal structure which belongs to the space group R-3m or C2/m, expansion and contraction of the lattice generated due to charge and discharge is relatively small. As a result, the lithium composite oxide having a crystal structure which belongs to the space group R-3m or C2/m is less likely to be deteriorated even in a non-aqueous electrolyte. Therefore, the cycle characteristic is further improved in the secondary battery according to the fifth aspect. In addition, the secondary battery according to the fifth aspect can also exert an effect that the battery can be assembled in a discharged state.

In a sixth aspect, for example, a concentration of the lithium salt in the non-aqueous electrolyte of the secondary battery according to any of the first to fifth aspects may be not less than 0.5 mol/L and not more than 3.5 mol/L.

In the secondary battery according to the sixth aspect, the cycle characteristic is further improved.

<Embodiment of Present Disclosure>

Hereinafter, an embodiment of the present disclosure will be described in detail with reference to the drawings. The following embodiment is one example, and the present disclosure is not limited to the following embodiment.

A secondary battery according to the embodiment of the present disclosure comprises a cathode, an anode, and a non-aqueous electrolyte. The cathode has a cathode current collector and a cathode mixture layer. The anode has an anode current collector and a coating layer that coats the surface of the anode current collector. The coating layer contains the alkaline earth metal fluoride. The non-aqueous electrolyte contains a non-aqueous solvent and a lithium salt which has been dissolved in the non-aqueous solvent. In the secondary battery according to the present embodiment, a lithium metal is deposited on the anode during charge, and the lithium metal is dissolved in the non-aqueous electrolyte during discharge.

The coating layer does not have to coat the entire surface of the anode current collector entirely. In other words, the surface of the anode current collector may include a region which has not been coated with the coating layer. The coating layer may be in the form of a film or an island on the surface of the anode current collector.

In the secondary battery according to the present embodiment, the surface of the anode current collector is coated with a coating layer containing the alkaline earth metal fluoride. According to this configuration, the cycle characteristic of the secondary battery according to the present embodiment is improved. It is conceivable that the reason for this improvement in the cycle characteristic is that overvoltage when the lithium metal is deposited on the anode is decreased, and that reductive decomposition of the non-aqueous solvent contained in the non-aqueous electrolyte is suppressed.

It is conceivable that the reductive decomposition reaction of the non-aqueous solvent contained in the non-aqueous electrolyte mainly proceeds in the charge process of the secondary battery. When the lithium metal is deposited by the charge, a side reaction between the lithium metal and the non-aqueous solvent occurs easily due to the reduction ability of the lithium metal. In addition, the side reaction between the lithium metal and the non-aqueous solvent also occurs easily due to the overvoltage when the lithium metal is deposited during constant current charge. Due to the side reaction, the non-aqueous solvent is reductively decomposed, and the lithium metal is turned into a compound, such as lithium carbonate or lithium chloride, which is difficult to be dissolved again by discharge. If such a compound is formed due to the side reaction between the lithium metal and the non-aqueous solvent, the discharge capacity retention ratio is decreased along with the charge/discharge cycle.

On the other hand, in the secondary battery according to the present embodiment, the coating layer containing the alkaline earth metal fluoride is present on the surface of the anode current collector. As a result, when the lithium metal is deposited, the alkaline earth metal fluoride is first reduced by the lithium metal, and an alkaline earth metal in a metal state is generated. Due to the alloying reaction between the alkaline earth metal and lithium, the overvoltage when the lithium metal is deposited on the anode is decreased. As a result, it is conceivable that reductive decomposition of the non-aqueous solvent is suppressed. Therefore, the cycle characteristic of the secondary battery according to the present embodiment is improved.

The coating layer may further contain other components such as a binder, for example, as components other than the alkaline earth metal fluoride. Examples of the binder include carboxymethyl cellulose, polyvinylidene fluoride, and polyvinylidene fluoride-hexafluoropropylene.

The coating layer may include, for example, the alkaline earth metal fluoride as a main component. The sentence "the coating layer contains the alkaline earth metal fluoride as a main component" means that the content of the alkaline earth metal fluoride is the largest proportion (percent by mass) among the components contained in the coating layer. The coating layer may be a layer composed only of the alkaline earth metal fluoride. If the coating layer contains two or more kinds of the alkaline earth metal fluorides, the content of the alkaline earth metal fluorides means the sum of the contents of the alkaline earth metal fluorides.

Hereinafter, the secondary battery according to the present embodiment will be described in more detail with reference to a specific configuration example.

Figure 1:
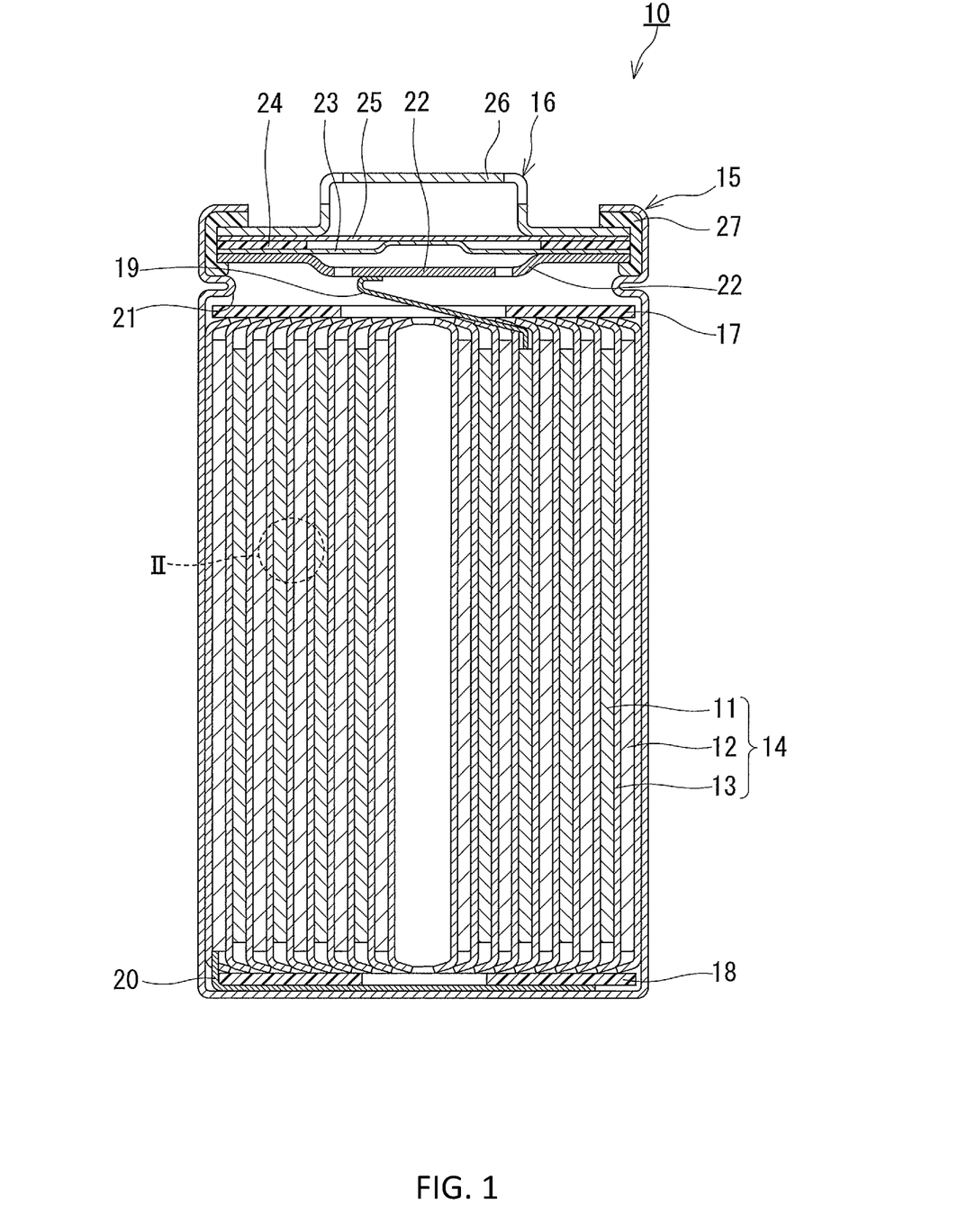
FIG. 1 is a vertical cross-sectional view schematically showing a secondary battery according to one embodiment of the present disclosure.

FIG. 1 is a vertical cross-sectional view schematically showing a secondary battery 10 according to one embodiment of the present disclosure. As shown in FIG. 1, the secondary battery 10 is a cylindrical battery comprising a cylindrical battery case, a rolled electrode group 14, and a non-aqueous electrolyte (not shown). The electrode group 14 is stored in the battery case and is in contact with the non-aqueous electrolyte.

The battery case is composed of a case body 15 that is a bottomed cylindrical metal container, and a sealing body 16 that seals an opening of the case body 15. A gasket 27 is disposed between the case body 15 and the sealing body 16. The gasket 27 ensures the sealing of the battery case. In the case body 15, insulating plates 17 and 18 are respectively disposed at both ends of the electrode group 14 in a rolling axis direction of the electrode group 14.

The case body 15 has, for example, a recess portion 21. The recess portion 21 can be formed by partially pressing the side wall of the case body 15 from the outside thereof. The recess portion 21 may be formed in an annular shape along the circumferential direction of an imaginary circle defined by the case body 15 on the side wall of the case body 15. In this case, the sealing body 16 is supported by a surface of an upper part of the recess portion 21, for example.

The sealing body 16 comprises a filter 22, a lower valve body 23, an insulation member 24, an upper valve body 25, and a cap 26. In the sealing body 16, these members are stacked in this order. The sealing body 16 is attached to the opening of the case body 15 in such a manner that the cap 26 is located outside the case body 15 and that the filter 22 is located inside the case body 15.

Each of the above members forming the sealing body 16 is, for example, disk-shaped or ring-shaped. The above members other than the insulation member 24 are electrically connected to each other.

The electrode group 14 has a cathode 11, an anode 12, and a separator 13. Each of the cathode 11, the anode 12, and the separator 13 is strip-shaped. The width directions of the strip-shaped cathode 11 and the strip-shaped anode 12 are parallel to the rolling axis of the electrode group 14, for example. The separator 13 is disposed between the cathode 11 and the anode 12. The cathode 11 and the anode 12 are rolled spirally in a state where the separator 13 is provided between these electrodes.

When the cross section of the secondary battery 10 in the direction perpendicular to the rolling axis of the electrode group 14 is observed, the cathode 11 and the anode 12 are stacked alternately in a radial direction of an imaginary circle defined by the case body 15 in a state where the separator 13 is provided between these electrodes.

The cathode 11 is electrically connected through a cathode lead 19 to the cap 26 that doubles as a cathode terminal. One end of the cathode lead 19 is connected to, for example, the vicinity of the center of the cathode 11 in the length direction of the cathode 11. The cathode lead 19 extends from the cathode 11 to the filter 22 through a through hole formed in the insulating plate 17. The other end of the cathode lead 19 is welded onto, for example, the lower surface of the filter 22.

The anode 12 is electrically connected through an anode lead 20 to the case body 15 that doubles as an anode terminal. One end of the anode lead 20 is connected to, for example, the end of the anode 12 in the length direction of the anode 12. The other end of the anode lead 20 is welded onto, for example, the inner bottom surface of the case body 15.

Hereinafter, the configuration of the secondary battery 10 will be specifically described.

(Cathode 11)

Figure 2:
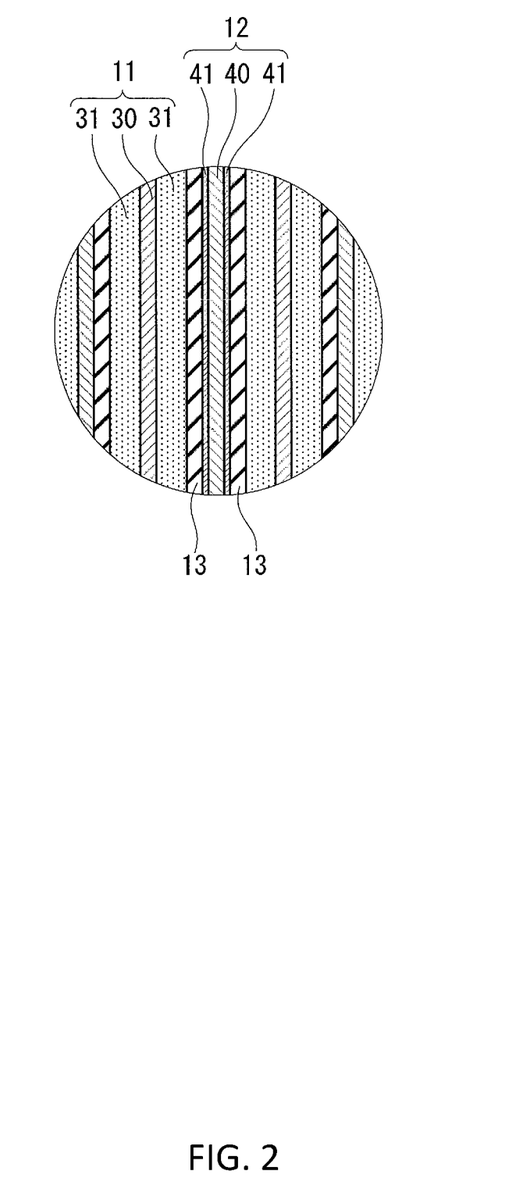
FIG. 2 is an enlarged view of the region II shown in FIG. 1.

FIG. 2 is an enlarged view of the region II shown in FIG. 1. As shown in FIG. 2, the cathode 11 has, for example, a cathode current collector 30 and a cathode mixture layer 31. The cathode mixture layer 31 is disposed, for example, on the cathode current collector 30. The cathode mixture layer 31 is disposed, for example, on the surface of the cathode current collector 30 in direct contact with the cathode current collector 30. The cathode mixture layer 31 contains a cathode active material. Each of the cathode current collector 30 and the cathode mixture layer 31 is, for example, strip-shaped. The cathode current collector 30 has, for example, a pair of principal surfaces which faces each other. The "principal surface" means a surface having the largest area of the cathode current collector 30. As shown in FIG. 2, in the cathode 11, two cathode mixture layers 31 may be respectively formed on a pair of principal surfaces of the cathode current collector 30. However, in the cathode 11, one cathode mixture layer 31 may be formed only on one principal surface of the cathode current collector 30. In the cathode 11, the cathode mixture layer 31 may be formed only on one principal surface of the cathode current collector 30 in the region connected to the cathode lead 19 and/or the region which does not face the anode 12.

As the cathode current collector 30, a cathode current collector used for a known secondary battery can be used. Examples of the material of the cathode current collector 30 include a metal material. Examples of the metal material include stainless steel, iron, and aluminum.

The cathode mixture layer 31 contains a cathode active material as an essential component. The cathode mixture layer 31 may contain a conductive material and/or a binder as optional components. The cathode mixture layer 31 may contain an additive, if necessary.

As the cathode active material contained in the cathode mixture layer 31, for example, a lithium composite oxide is used. The crystal structure of the lithium composite oxide is not particularly limited. The lithium composite oxide may be an oxide having a crystal structure which belongs to a space group R-3m or C2/m. In the lithium composite oxide having such a crystal structure, expansion and contraction of the lattice generated due to the charge/discharge are relatively small. Therefore, the lithium composite oxide having a crystal structure which belongs to the space group R-3m or C2/m is less likely to be deteriorated even in a non-aqueous electrolyte. As a result, the excellent cycle characteristic is easily provided. In a case where the lithium composite oxide having a crystal structure which belongs to the space group R-3m or C2/m is used as the cathode active material, the battery can be assembled in a discharged state. The lithium composite oxide having a crystal structure which belongs to the space group R-3m or C2/m may contain at least one selected from the group consisting of nickel, cobalt, and manganese. For example, in a case where the lithium composite oxide having a crystal structure which belongs to the space group R-3m or C2/m contains nickel, cobalt, and manganese, a ratio of nickel atoms to a sum of nickel, cobalt, and manganese atoms may be not less than 50 atomic %.

The conductive material includes, for example, a carbon material. Examples of the carbon material include carbon black, carbon nanotube, and graphite. Examples of the carbon black include acetylene black and ketjen black. The cathode mixture layer 31 may contain one or more kinds of the conductive materials. Examples of the binder include fluororesin, polyacrylonitrile resin, polyimide resin, acrylic resin, polyolefin resin, and rubbery polymer. Examples of the fluororesin include polytetrafluoroethylene and polyvinylidene fluoride. The cathode mixture layer 31 may contain one or more kinds of the binders.

A layer containing a conductive carbon material may be disposed between the cathode current collector 30 and the cathode mixture layer 31, if necessary. Examples of the carbon material include the materials described above for the conductive material.

The cathode 11 can be produced, for example, by the following method. First, a slurry containing the material of the cathode mixture layer 31 and a dispersion medium is prepared. As the dispersion medium, water and/or an organic medium can be used. Next, the slurry is applied to the surface of the cathode current collector 30 to provide a film. The cathode 11 can be produced by drying the provided film, and then, pressing it with a roller. If the cathode 11 has a layer containing the carbon material, the layer containing the carbon material is produced prior to the production of the cathode mixture layer 31. The layer containing the carbon material can be produced, for example, by the following method. First, a dispersion liquid containing the carbon material is prepared. The dispersion liquid is applied to the surface of the cathode current collector 30 to provide a film. The provided film is dried to produce the layer containing the carbon material.

(The Anode 12)

In the anode 12 of the secondary battery 10, a lithium metal is deposited during the charge. In particular, the lithium ions included in the non-aqueous electrolyte receive electrons on the anode 12 during the charge and are turned into the lithium metal, and the lithium metal is deposited on the anode 12. The lithium metal deposited on the anode 12 is dissolved as lithium ions in the non-aqueous electrolyte during the discharge. The anode 12 shown in FIG. 2 is in a completely discharged state. In other words, on the anode 12 shown in FIG. 2, the lithium metal deposited during the charge is dissolved in the non-aqueous electrolyte during the discharge.

As shown in FIG. 2, the anode 12 comprises an anode current collector 40 and a coating layer 41 which coats a surface of the anode current collector 40. As above described, the coating layer 41 is a layer containing the alkaline earth metal fluoride. For example, the anode current collector 40 is strip-shaped. For example, the anode current collector 40 has a pair of principal surfaces which faces each other. The term "principal surface" means a surface having the largest area of the anode current collector 40. The coating layer 41 shown in FIG. 2 is provided so as to coat the both of the pair of the principal surfaces of the anode current collector 40. However, the coating layer 41 may be provided so as to coat only one principal surface of the anode current collector 40.

In the secondary battery 10, the coating layer 41 has a shape of a film, and the coating layer 41 coats the entire surface of the anode current collector 40. However, as above described, the coating layer 41 does not have to coat the entire surface of the anode current collector 40. The surface of the anode current collector 40 may have a region which has not been coated with the coating layer 41. The coating layer 41 may be present on the surface of the anode current collector 40 in a form of an island.

Since the surface of the anode current collector 40 is coated with the coating layer 41, the cycle characteristic of the secondary battery is improved. As above described, the reason therefor is that the overvoltage when the lithium metal is deposited on the anode 12 is suppressed, and that, as a result, the side reaction between the lithium metal and the non-aqueous solvent is less likely to occur.

The alkaline earth metal fluoride contained in the coating layer 41 may include, for example, at least one kind selected from the group consisting of magnesium fluoride and barium fluoride. Since the coating layer 41 contains magnesium fluoride and/or barium fluoride, the cycle characteristic of the secondary battery 10 is further improved.

The mass of the coating layer 41 per unit area of the anode current collector 40 may be not less than 0.94 μg/cm². If the mass of the coating layer 41 per unit area of the anode current collector 40 is not less than 0.94 μg/cm², the overvoltage when the lithium metal is deposited on the anode 12 is further suppressed. As a result, since the side reaction between the lithium metal and the non-aqueous solvent is much less likely to occur, the cycle characteristic of the secondary battery 10 is further improved. The mass of the coating layer 41 per unit area of the anode current collector 40 may be not less than 3.15 μg/cm².

The mass of the coating layer 41 per unit area of the anode current collector 40 may be not more than 48.9 μg/cm². If the mass of the coating layer 41 per unit area of the anode current collector 40 is not more than 48.9 μg/cm², a lithium-alloying reaction of the alkaline earth metal and a delithiation reaction are suppressed. As a result, the decrease in the discharge capacity generated due to the fact that the voltage of the secondary battery 10 quickly reaches its control lower limit voltage as a battery is suppressed. As a result, a high discharge capacity retention ratio is realized. In addition, since expansion of an influence of a low cycle characteristic generated due to the lithium-alloying reaction of the alkaline earth metal and the delithiation reaction is also suppressed, the cycle characteristic of the battery is improved.

The mass of the coating layer 41 per unit area of the anode current collector 40 can be calculated in accordance with the following formula, using a surface area of the anode current collector 40 and a total mass of the coating layer 41 held by the anode current collector 40.

(The mass of the coating layer per unit area of the anode current collector) (μg/cm²)=(The total mass of the coating layer present on the anode current collector) (μg)/(The area of the surface which faces the cathode in the anode current collector) (cm²)

For example, the total mass of the coating layer 41 present on the anode current collector 40 is determined by a mass measurement. Specifically, the difference between the mass of the anode current collector 40 having a surface which has been coated with the coating layer 41 and the mass of the anode current collector 40 having a surface which has not been coated with the coating layer 41 is calculated, and the calculated difference can be defined as the total mass of the coating layer 41.

The thickness of coating layer 41 is not limited in particular. If the coating layer 41 has a shape of a film, for example, an average of the thickness of the coating layer 41 may be not less than 3 nm. In addition, for example, the average of the thickness of the coating layer 41 may be not more than 100 nm. Here, the average of the thickness of the coating layer 41 may be an average of values measured at arbitrary plural points (for example, five points). The thickness of the coating layer 41 may be measured with an electron microscope image of the cross section thereof.

The anode current collector 40 is usually composed of a conductive sheet. The material of the anode current collector 40 may be a metal material such as a metal or an alloy. Examples of the metal material include a lithium metal and a lithium alloy. The anode current collector 40 may be composed of a lithium metal or a lithium alloy. The metal material may be a material that does not react with lithium. Such materials include materials that do not react with a lithium metal and/or lithium ions. More specifically, the metal material may be a material that does not form an alloy or an intermetallic compound with lithium. Examples of such metal materials include copper, nickel, iron, and alloys containing these metal elements. The alloy may be a copper alloy or stainless steel. From the viewpoint of having high conductivity and easily improving the capacity and charge/discharge efficiency of the secondary battery 10, the metal material may be copper or an alloy thereof. The anode current collector 40 may contain one or more kinds of these metal materials. The anode current collector 40 may contain a conductive material other than the metal material.

As the anode current collector 40, a foil or a film is used. The anode current collector 40 may be porous. From the viewpoint of easily ensuring high conductivity, the anode current collector 40 may be a metal foil (e.g., a metal foil containing copper). Examples of the metal foil containing copper are a copper foil and a copper alloy foil. The copper content in the metal foil may be not less than 50 mass %, or not less than 80 mass %. In particular, the metal foil may be a copper foil containing substantially only copper as a metal. The anode current collector 40 has a thickness of, for example, not less than 5 μm and not more than 20 μm.

From the viewpoint of easily ensuring a high volume energy density, the anode 12 may include only the anode current collector 40 and the coating layer 41 in the completely discharged state of the secondary battery 10. In this case, the anode current collector 40 may be formed of a material that does not react with lithium.

In the present disclosure, the completely discharged state of the lithium secondary battery means a state where the secondary battery 10 is discharged in such a manner that the state of charge (i.e., SOC) reaches not more than 0.05×C (where C represents a rating capacity of the battery). The completely discharged state of the lithium secondary battery means a state where the lithium secondary battery is discharged to a lower limit voltage at a constant current of 0.05

C, for example. The lower limit voltage of the secondary battery 10 is, for example, 2.5V.

The anode 12 may further comprise a protection layer. The protection layer is formed, for example, on the surface of the anode current collector 40 to which the coating layer 41 has been provided. In other words, in a case where the surface of the anode current collector 40 is coated with the coating layer 41 having a shape of a film, the anode current collector 40, the coating layer 41, and the protection layer are stacked in this order. In a case where the island-shaped coating layer 41 is present on the surface of the anode current collector 40, in a part where the coating layer 41 is present, the anode current collector 40, the coating layer 41, and the protection layer are stacked in this order. In a part where the coating layer 41 is not present, the anode current collector 40 and the protection layer are stacked in this order.

The protection layer allows the reaction on the surface of the electrode to proceed more uniformly. The protection layer facilitates the lithium metal to be deposited further uniformly on the anode 12.

As the material for the protection layer, a material that does not inhibit the conduction of the lithium ions is used. The protection layer is composed of, for example, an organic material and/or an inorganic material. Examples of the organic material include a polymer having lithium ion conductivity. Examples of such a polymer include polyethylene oxide and polymethyl methacrylate. Examples of the inorganic material include ceramics and a solid electrolyte. Examples of the material of the ceramics include $SiO_2$, $Al_2O_3$ and MgO.

The solid electrolyte forming the protection layer is not particularly limited. Examples of the solid electrolyte include a sulfide solid electrolyte, a phosphoric acid solid electrolyte, a perovskite solid electrolyte, and a garnet solid electrolyte. From the viewpoint of relatively low cost and easy availability, it is preferable that the solid electrolyte is a sulfide solid electrolyte and/or a phosphoric acid solid electrolyte.

The sulfide solid electrolyte is not particularly limited, as long as the sulfide solid electrolyte is a solid electrolyte containing a sulfur component and having lithium ion conductivity. The sulfide solid electrolyte may contain, for example, S, Li, and other elements other than these. Examples of the other elements include at least one selected from the group consisting of P, Ge, B, Si, I, Al, Ga, and As. Examples of the sulfide solid electrolyte include $Li_2S$—$P_2S_5$, $70Li_2S$-$30P_2S_5$, $80Li_2S$-$20P_2S_5$, $Li_2S$—$SiS_2$, and $LiGe_{0.25}P_{0.75}S_4$.

The phosphoric acid solid electrolyte is not particularly limited, as long as the phosphoric acid solid electrolyte is a solid electrolyte containing a phosphoric acid component and having lithium ion conductivity. Examples of the phosphoric acid solid electrolyte are $Li_{1+X}Al_XTi_{2-X}(PO_4)_3$ and $Li_{1+X}Al_XGe_{2-X}(PO_4)_3$. In the composition formula, the mathematical formula $0<X<2$ is satisfied. The mathematical formula $0<X\leq1$ may be satisfied. An example of $Li_{1+X}Al_XTi_{2-X}(PO_4)_3$ is $Li_{1.5}Al_{0.5}Ti_{1.5}(PO_4)_3$.

The anode 12 may be produced, for example, by the following method. First, the anode current collector 40 is prepared. The coating layer 41 is formed on the surface of the anode current collector 40. The coating layer 41 may be produced by, for example, a gas phase method such as a sputtering method. The coating layer 41 may be produced by a coating method. For example, a slurry containing the alkaline earth metal fluoride and optionally further containing other components such as a binder is prepared. As a dispersion medium used for this slurry, water and/or an organic medium can be used. Next, the slurry is applied to the surface of the anode current collector 40. In this way, a film is provided. The provided film is dried to produce the coating layer 41.

[Separator 13]

The separator 13 has, for example, properties of ion permeability and electrical insulation. For example, a porous sheet is used as the separator 13. Examples of the separator 13 include a microporous film, a woven fabric, and a nonwoven fabric. The material of the separator 13 is not particularly limited, and may be a polymer material.

Examples of the polymer material include olefin resin, polyamide resin, and cellulose. The olefin resin may contain a polymer containing, as a monomer unit, at least one selected from the group consisting of ethylene and propylene. This polymer may be a homopolymer or a copolymer. Examples of this polymer include polyethylene and polypropylene.

The separator 13 may further contain an additive in addition to the polymer material, if necessary. An example of the additive is an inorganic filler.

[Non-Aqueous Electrolyte]

The non-aqueous electrolyte contains a non-aqueous solvent and a lithium salt. The lithium salt has been dissolved in the non-aqueous solvent.

The non-aqueous solvent is, for example, an ester, an ether, a nitrile, an amide, or a halogen-substituted product thereof. The non-aqueous electrolyte may contain one kind of non-aqueous solvent, or may contain two or more kinds of non-aqueous solvents. The halogen-substituted product is, for example, a fluoride.

Examples of the ester are a carbonate ester and a carboxylate ester.

Examples of the carbonate ester include a cyclic carbonate ester and a chain carbonate ester. Examples of the cyclic carbonate ester include ethylene carbonate, propylene carbonate, and fluoroethylene carbonate. Examples of the chain carbonate ester include dimethyl carbonate, ethyl methyl carbonate, and diethyl carbonate.

Examples of the carboxylate ester include a cyclic carboxylate ester and a chain carboxylate ester. Examples of the cyclic carboxylate ester include γ-butyrolactone and γ-valerolactone. Examples of the chain carboxylate ester include ethyl acetate, methyl propionate, and methyl fluoropropionate.

Examples of the ether include a cyclic ether and a chain ether. Examples of the cyclic ether include 1,3-dioxolan, 4-methyl-1,3-dioxolan, tetrahydrofuran, and 2-methyltetrahydrofuran. Examples of the chain ether include 1,2-dimethoxyethane, diethyl ether, ethyl vinyl ether, methylphenyl ether, benzylethyl ether, diphenylether, dibenzylether, 1,2-diethoxyethane, and diethyleneglycoldimethylether.

Examples of the nitrile include acetonitrile, propionitrile, and benzonitrile.

Examples of the amide include dimethylformamide and dimethylacetamide.

Examples of the lithium salt include $LiClO_4$, $LiBF_4$, $LiPF_6$, $LiN(SO_2F)_2$, $LiN(SO_2CF_3)_2$, lithium bis(oxalate) borate (abbreviated as LiBOB), and lithium difluoro(oxalate) borate (abbreviated as LiDFOB).

The lithium salt may include at least one selected from the group consisting of $LiBF_4$, $LiPF_6$, $LiN(SO_2CF_3)_2$, $LiN(SO_2F)_2$, and LiDFOB. These lithium salts can further improve the ionic conductivity of the non-aqueous electrolyte.

The concentration of the lithium salt in the non-aqueous electrolyte is not specifically limited, for example, is not less than 0.5 mol/L and not more than 3.5 mol/L.

The lithium ions contained in the non-aqueous electrolyte may be ions derived from a lithium salt added to the non-aqueous electrolyte, or may be ions supplied from the cathode active material by charging the secondary battery 100. The lithium ions contained in the non-aqueous electrolyte may be a mixture of the ions derived and supplied therefrom.

The non-aqueous electrolyte may further contain an additive. A film may be formed on the anode 12 with the additive. By forming the film derived from the additive on the anode 12, the charge/discharge reaction of the secondary battery 10 easily proceeds more uniformly. As a result, in the secondary battery 10, a high discharge capacity is ensured, and the decrease in the cycle characteristic is further suppressed. Examples of such additives include vinylene carbonate, fluoroethylene carbonate, and vinyl ethylene carbonate. The additive may contain one or more kinds of these compounds.

[Others]

In the embodiment of the present disclosure, the configuration example illustrated in FIG. 1, namely, the cylindrical secondary battery 10 comprising the cylindrical battery case has been described. However, the secondary battery of the present disclosure is not limited to the above configuration example. The secondary battery according to the present disclosure may be, for example, a prismatic battery comprising a rectangular battery case or a laminate battery comprising a resin outer package such as an aluminum laminate sheet. In addition, the electrode group of the secondary battery according to the present disclosure is not limited to the rolled-shaped one. The electrode group of the secondary battery according to the present disclosure may be an electrode group in which a plurality of cathodes and a plurality of anodes are alternately stacked via separators.

EXAMPLES

Hereinafter, the embodiment of the present disclosure will be described more specifically on the basis of the following examples. However, the present disclosure is not limited to the following examples.

<Inventive Examples 1 to 7 and Comparative Examples 1 and 2>

[Production of Secondary Battery]

A secondary battery having the structure shown in FIG. 1 was produced by the following procedure.

(1) Cathode

First, a cathode active material, acetylene black as a conductive material, and polyvinylidene fluoride as a binder were mixed at a mass ratio of 95:2.5:2.5. An appropriate amount of N-methyl-2-pyrrolidone was added to the provided mixture as a dispersion medium. In this way, a cathode mixture slurry was prepared. As the cathode active material, the lithium composite oxide represented by $LiNi_{0.8}Co_{0.15}Al_{0.05}O_2$, which contained Ni, Co, and Al, was used. The used lithium composite oxide had a crystal structure which belonged to the space group R-3m or C2/m.

Aluminum foil was prepared as a cathode current collector. The cathode mixture slurry was applied to both of a pair of principal surfaces of the aluminum foil. The provided coating films were dried to provide a dried product. Next, the dried product was pressed in the thickness direction of the dried product using a roller. In this way, a stacking structure was provided. By cutting the provided stacking structure into a predetermined size, a cathode having cathode mixture layers on both of the pair of the principal surfaces of the cathode current collector was provided. The cathode mixture layers were not formed in a part of the principal surfaces of the cathode current collector. In the part where the cathode mixture layers were not formed, the part of the cathode current collector was exposed to the outside thereof. In the region, one end of a cathode lead formed of aluminum was attached to the cathode current collector by welding.

(2) Anode

In the inventive examples 1 to 7, a coating layer formed of the alkaline earth metal fluoride was formed on the surface of the anode current collector by the following procedure.

As an anode current collector, an electrolytic copper foil having a thickness of 12 μm was prepared. The coating layers each composed of the alkaline earth metal fluoride shown in Table 1 was formed on both surfaces of the electrolytic copper foil by a sputtering method. The electrolytic copper foil having the surfaces on each of which the coating layer had been formed was cut into a predetermined electrode size to produce an anode. In other words, an anode in which the coating layers were provided on both of the pair of the principal surfaces of the anode current collector was provided.

The film forming conditions by the sputtering method were as follows.

Power supply: RF (high frequency)
Power (W): 200
Ar flow rate (sccm): 90.0
Pressure before film formation (Pa): $1.00 \times 10^{-3}$
Film forming pressure (Pa): $2.44 \times 10^{-1}$
Substrate heating: None
Drive (RPM): 1
TS (mm): 50

In the above film formation conditions, "TS" represents a distance between the target and the substrate. In the present examples, the "substrate" is an electrolytic copper foil. In addition, as the target, the material of the coating layer shown in Table 1 was used.

The film formation period was varied in the inventive examples in consideration of the mass of the coating layer formed on the anode current collector.

The anode of the comparative example 1 was composed only of the anode current collector. In other words, the above-described electrolytic copper foil was used as the anode of the comparative example 1.

The coating layer was formed on the anode of the comparative example 2 by a sputtering method using lithium fluoride in place of the alkaline earth metal fluoride. The anode of the comparative example 2 was produced in the same procedure as the anodes of the inventive examples 1 to 7, except for the material of the coating layer.

Table 1 shows the mass of the coating layer per unit area of the anode current collector in the anodes of the inventive examples 1 to 7 and the anode of the comparative example 2. The difference between the mass of the anode current collector after being coated with the coating layer and the mass of the anode current collector before being coated with the coating layer was calculated, and the calculated difference was defined as the total mass of the coating layer. Using the total mass of the coating layer and the area of the surface of the anode current collector which faces the cathode, the mass of the coating layer per unit area of the anode current collector was determined. In Table 1, "mass of coating layer per unit area of anode current collector" is described as "mass of coating layer". The mass of the coating layer per unit area of the anode current collector was adjusted by changing sputtering conditions.

(3) Non-Aqueous Electrolyte

A non-aqueous solvent and a lithium salt shown in Tables 1 and 2 were prepared. The non-aqueous solvent was a mixture of two compounds. Tables 1 and 2 also show a volume ratio of the two compounds in the non-aqueous solvent. The lithium salt was dissolved in a non-aqueous solvent to prepare a liquid non-aqueous electrolyte. The concentration of the lithium salt in the non-aqueous electrolyte was 1.0 mol/L. The non-aqueous solvent and the lithium salt shown in Tables 1 and 2 are as follows.

Non-Aqueous Solvent
(a) FEC: fluoroethylene carbonate
(b) DMC: dimethyl carbonate
(c) MA: methyl acetate Lithium Salt
(d) $LiPF_6$: lithium hexafluorophosphate (4) Secondary Battery In an inert gas atmosphere, the cathode provided in the section (1) and the anode provided in the section (2) were stacked so as to provide a separator between the cathode and the anode. As the separator, a polyethylene microporous film was used. Specifically, the cathode, the separator, the anode, and another separator were stacked in this order to provide a stacking structure. The provided stacking structure was rolled spirally to provide an electrode group. The provided electrode group was inserted into a bag-shaped outer package. The outer package was composed of a laminate sheet comprising an Al layer. Next, a non-aqueous electrolyte was injected into the outer package, and the outer package was sealed. In this way, the secondary batteries of the inventive examples 1 to 7 and the comparative examples 1 and 2 were provided.

[Evaluation of Secondary Battery]

Each of the provided secondary batteries was subjected to a charge/discharge test in accordance with the following procedure to evaluate a discharge capacity and a cycle characteristic of each of the secondary batteries.

First, the secondary battery was charged in a constant temperature bath maintained at 25° C. Next, the secondary battery was left at rest for 20 minutes, and then, the secondary battery was discharged. The conditions for charging and discharging the secondary battery are as follows.

(Charge)

A constant current charge was performed at a current of 10 mA per one square centimeter of an area of the electrode. The constant current charge was performed until the battery voltage of the secondary battery reached 4.7V. Next, a constant voltage charge was performed at a voltage of 4.7V. The constant voltage charge was performed until the current value per one square centimeter of the area of the electrode reached 1 mA.

(Discharge)

A constant current discharge was performed at a current of 10 mA per one square centimeter of the area of the electrode. The constant current discharge was performed until the battery voltage of the secondary battery reached 2.5V.

The above charge and discharge are defined as one cycle. In the charge/discharge test, the above charge and discharge were performed for 100 cycles. The discharge capacity of the secondary battery in the first cycle is defined as an initial discharge capacity. The ratio of the discharge capacity of the secondary battery at the 100th cycle to the initial discharge capacity is defined as a discharge capacity retention ratio (%). The discharge capacity retention ratio can be used as an index of the cycle characteristic. Tables 1 and 2 show evaluation results of the secondary batteries of the inventive examples 1 to 7 and the comparative examples 1 and 2. Tables 1 and 2 also shows the material and the mass of the coating layer in the anode, and the non-aqueous solvent, the lithium salt, and the concentration of the lithium salt used for the non-aqueous electrolyte.

TABLE 1

|  | Material of Coating layer | Mass of Coating layer ($\mu m/cm^2$) | Non-aqueous solvent | Lithium salt | Concentration of Lithium Salt |
|---|---|---|---|---|---|
| Comparative Example 1 | None | 0 | FEC/MA 2/8 (v/v) | $LiPF_6$ | 1.0 |
| Comparative Example 2 | Lithium fluoride | 2.64 | FEC/MA 2/8 (v/v) | $LiPF_6$ | 1.0 |
| Inventive Example 1 | Magnesium fluoride | 0.94 | FEC/MA 2/8 (v/v) | $LiPF_6$ | 1.0 |
| Inventive Example 2 | Magnesium fluoride | 3.15 | FEC/MA 2/8 (v/v) | $LiPF_6$ | 1.0 |
| Inventive Example 3 | Magnesium fluoride | 3.15 | FEC/DMC 2/8 (v/v) | $LiPF_6$ | 1.0 |
| Inventive Example 4 | Magnesium fluoride | 31.5 | FEC/MA 2/8 (v/v) | $LiPF_6$ | 1.0 |
| Inventive Example 5 | Barium fluoride | 1.46 | FEC/MA 2/8 (v/v) | $LiPF_6$ | 1.0 |
| Inventive Example 6 | Barium fluoride | 4.89 | FEC/MA 2/8 (v/v) | $LiPF_6$ | 1.0 |
| Inventive Example 7 | Barium fluoride | 48.9 | FEC/MA 2/8 (v/v) | $LiPF_6$ | 1.0 |

TABLE 2

| | Initial discharge capacity mAh/g 0.2 C | Discharge capacity retention ratio at 100th cycle (%) |
|---|---|---|
| Comparative Example 1 | 254.3 | 55.1 |
| Comparative Example 2 | 254.3 | 55.0 |
| Inventive Example 1 | 254.2 | 57.2 |
| Inventive Example 2 | 254.8 | 60.4 |
| Inventive Example 3 | 254.4 | 60.8 |
| Inventive Example 4 | 253.1 | 61.6 |
| Inventive Example 5 | 254.1 | 56.2 |
| Inventive Example 6 | 254.7 | 60.5 |
| Inventive Example 7 | 253.5 | 60.9 |

As shown in Table 2, each of the secondary batteries of the inventive examples 1 to 7 had higher discharge capacity retention ratio after 100 cycles than the secondary batteries of the comparative examples 1 and 2. In other words, each of the secondary batteries of the inventive examples 1 to 7 had a more excellent cycle characteristic than the secondary batteries of the comparative examples 1 and 2. The difference between the secondary batteries of the inventive examples 1 to 7 and the secondary battery of the comparative example 1 is the presence or absence of the coating layer with which the surface of the anode current collector was coated. The difference between the secondary batteries of the inventive examples 1 to 7 and the secondary battery of the comparative example 2 is in the material of the coating layer. In the inventive examples 1 to 7, the material of the coating layer was the alkaline earth metal fluoride, whereas, the material of the coating layer was an alkaline metal fluoride in the comparative example 2. From these results, in the secondary batteries of the inventive examples 1 to 7, it is conceivable that the presence of the coating layer containing the alkaline earth metal fluoride on the surface of the anode current collector decreased the overvoltage when the lithium metal was deposited on the anode, and suppressed the side reaction between the lithium metal and the non-aqueous solvent. As a result, it is conceivable that the discharge capacity retention ratio was increased.

Furthermore, as can be seen from a comparison of the secondary battery of the inventive example 3 to the secondary battery of the inventive example 2, even if methyl acetate, which is a carboxylate ester, was replaced with dimethyl carbonate, which is a carbonate ester, the discharge capacity and the discharge capacity retention ratio were hardly changed. Furthermore, similarly to the secondary battery of the inventive example 2, the secondary battery of the inventive example 3 in which the non-aqueous solvent was replaced as described above also had a higher discharge capacity retention ratio than the secondary batteries of the comparative examples 1 and 2.

INDUSTRIAL APPLICABILITY

The secondary battery according to the present disclosure is excellent in a cycle characteristic. Therefore, the secondary battery according to the present disclosure is useful for various applications such as electronic devices such as mobile phones, smartphones, and tablet terminals, electric vehicles such as hybrid vehicles and plug-in hybrid vehicles, and home storage batteries combined with solar cells.

REFERENCE SIGNS LIST

10 Secondary battery
11 Cathode
12 Anode
13 Separator
14 Electrode group
15 Case body
16 Sealing body
17, 18 Insulating plate
19 Cathode lead
20 Anode lead
21 Recess portion
22 Filter
23 Lower valve body
24 Insulation member
25 Upper valve body
26 Cap
27 Gasket
30 Cathode current collector
31 Cathode mixture layer
40 Anode current collector
41 Coating layer

The invention claimed is:
1. A secondary battery, comprising:
a cathode comprising a cathode current collector and a cathode mixture layer containing a cathode active material;
an anode comprising an anode current collector and coating layer; and
a non-aqueous electrolyte containing a non-aqueous solvent and a lithium salt which has been dissolved in the non-aqueous solvent,
wherein:
a surface of the anode current collector is coated with the coating layer,
the coating layer consists of an alkaline earth metal fluoride,
the cathode active material includes a lithium composite oxide having a crystal structure which belongs to a space group R-3m or C2/m, and the lithium composite oxide contains Ni and Co,
the anode current collector is made of a metal material, the metal material including copper or an alloy thereof,
the coating layer is directly disposed on the surface of the anode current collector,
during charge, a lithium metal represented by the formula Li is deposited on the anode, and
during discharge, the lithium metal represented by the formula Li is dissolved in the non-aqueous electrolyte.
2. The secondary battery according to claim 1, wherein a mass of the coating layer per unit area of the anode current collector is not less than 0.94 μg/cm$^2$ and not more than 48.9 μg/cm$^2$.
3. The secondary battery according to claim 1, wherein the alkaline earth metal fluoride includes at least one kind selected from the group consisting of magnesium fluoride and barium fluoride.
4. The secondary battery according to claim 1, wherein the lithium salt includes at least one kind selected from the group consisting of LiBF$_4$, LiPF$_6$, LiN(SO$_2$CF$_3$)$_2$, LiN(SO$_2$F)$_2$, and lithium difluoro(oxalate) borate.

5. The secondary battery according to claim 1, wherein the lithium salt in the non-aqueous electrolyte has a concentration of not less than 0.5 mol/L and not more than 3.5 mol/L.

6. The secondary battery according to claim 1, wherein the lithium composite oxide further contains Mn.

7. The secondary battery according to claim 6, wherein a ratio of nickel atoms to a sum of nickel, cobalt, and manganese atoms in the lithium composite oxide is not less than 50 atomic %.

8. The secondary battery according to claim 1, wherein the lithium composite oxide further contains Al.

9. The secondary battery according to claim 1, further comprising a protective layer composed of an organic material including polyethylene oxide and polmethyl methacrylate.

10. The secondary battery according to claim 1, further comprising a protective layer composed of an inorganic material including a ceramic comprising at least one of $SiO_2$, $Al_2O_3$ and MgO.

11. The secondary battery according to claim 1, wherein the lithium composite oxide has a crystal structure belonging to the space group C2/m.

12. The secondary battery according to claim 1, wherein a mass of the coating layer per unit area of the anode current collector is not less than 0.94 µg/cm$^2$ and not more than 48.9 µg/cm$^2$, and the alkaline earth metal fluoride includes at least one kind selected from the group consisting of magnesium fluoride and barium fluoride.

* * * * *